Dec. 16, 1969     B. S. L. STRANDBERG ETAL     3,484,003
HYDRAULIC LOADING APPARATUS
Filed March 5, 1968     6 Sheets-Sheet 1
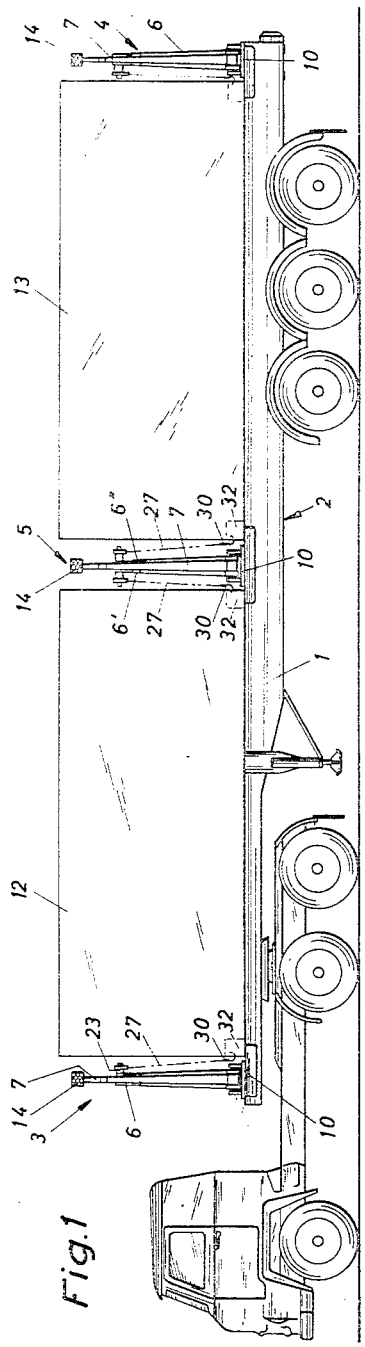
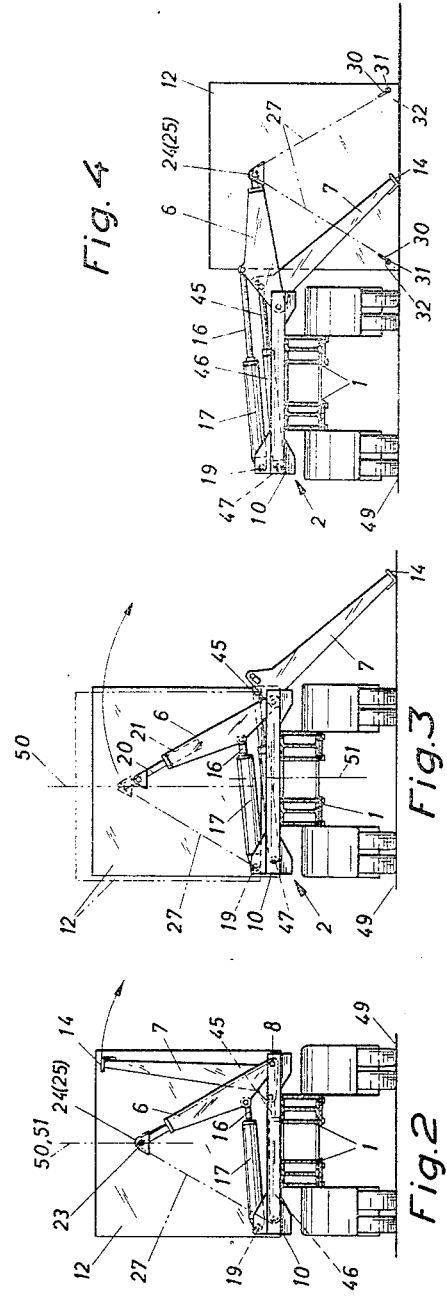
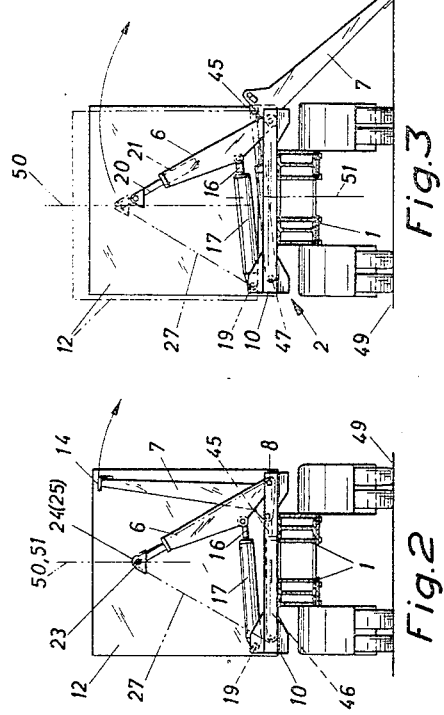

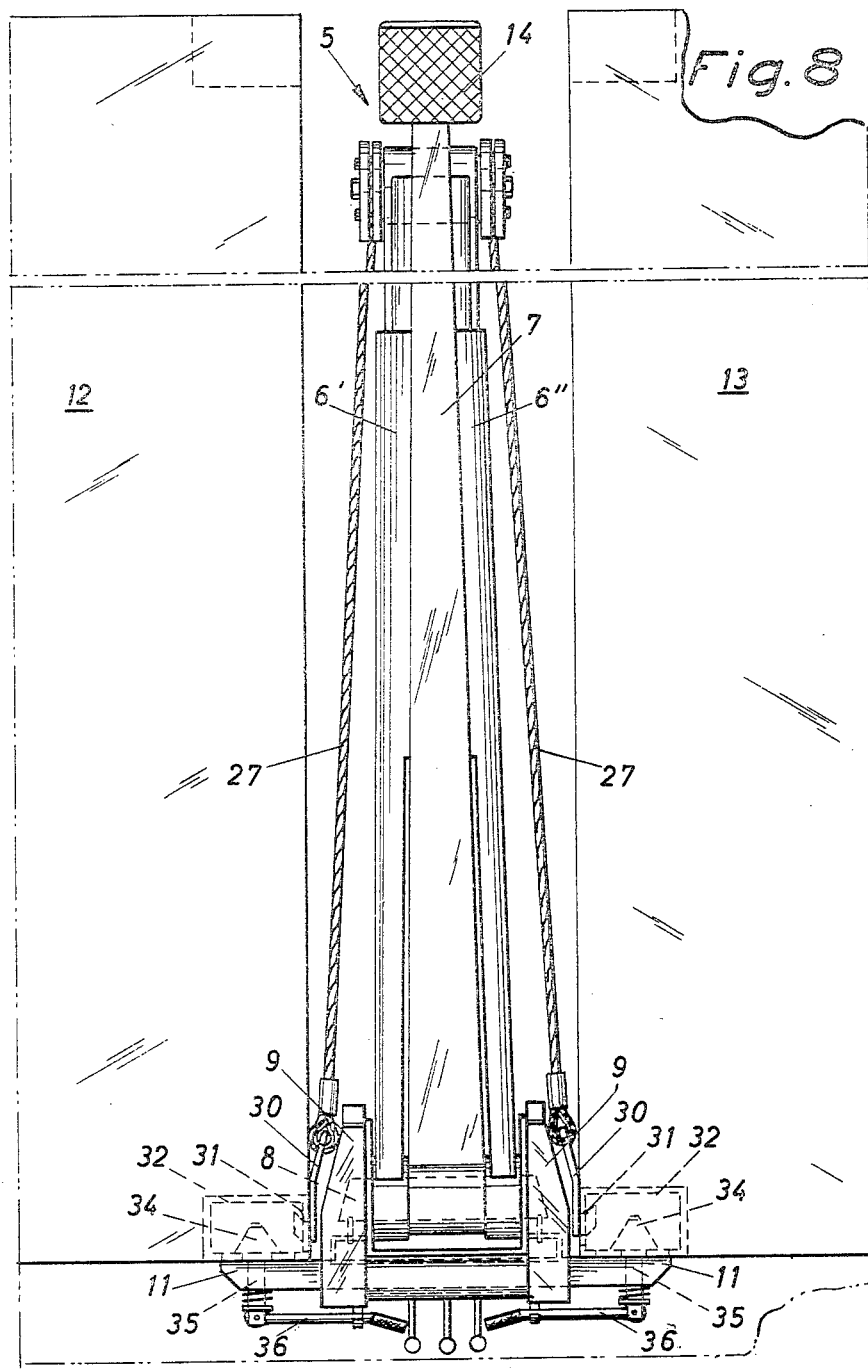

Fig.14
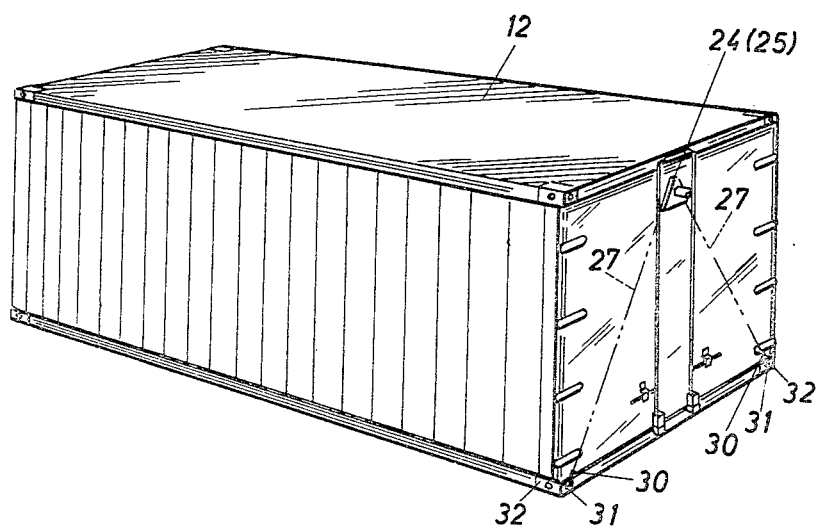
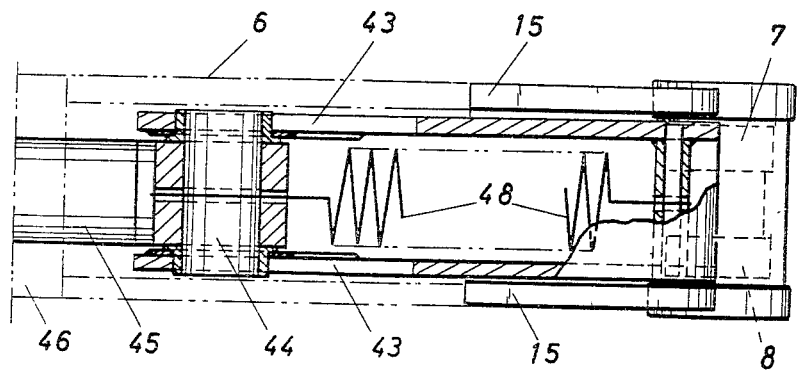
Fig.13

United States Patent Office 3,484,003
Patented Dec. 16, 1969

3,484,003
HYDRAULIC LOADING APPARATUS
Bengt Sigurd Lennart Strandberg, Gullanget, and Anders Erik Sundin, Forsa, Sweden, assignors to Hiab-Foco Aktiebolag Hudiksvall, Sweden, a corporation of Sweden
Filed Mar. 5, 1968, Ser. No. 710,473
Claims priority, application Sweden, Mar. 6, 1967, 3,040/67
Int. Cl. B60p 1/48; B66c 23/62
U.S. Cl. 214—77                                    8 Claims

ABSTRACT OF THE DISCLOSURE

The present invention relates to an apparatus for loading and unloading load containers, load flats etc. onto and off a conveyor vehicle. The loading device according to the invention comprises two superposed hydraulical piston-cylinder units, operating levers adapted to be swung about a common shaft, and comprising two parts, one serving as a loading arm and being at its lower end shaped as a fork housing the second part serving as a supporting leg.

---

Figure 5:
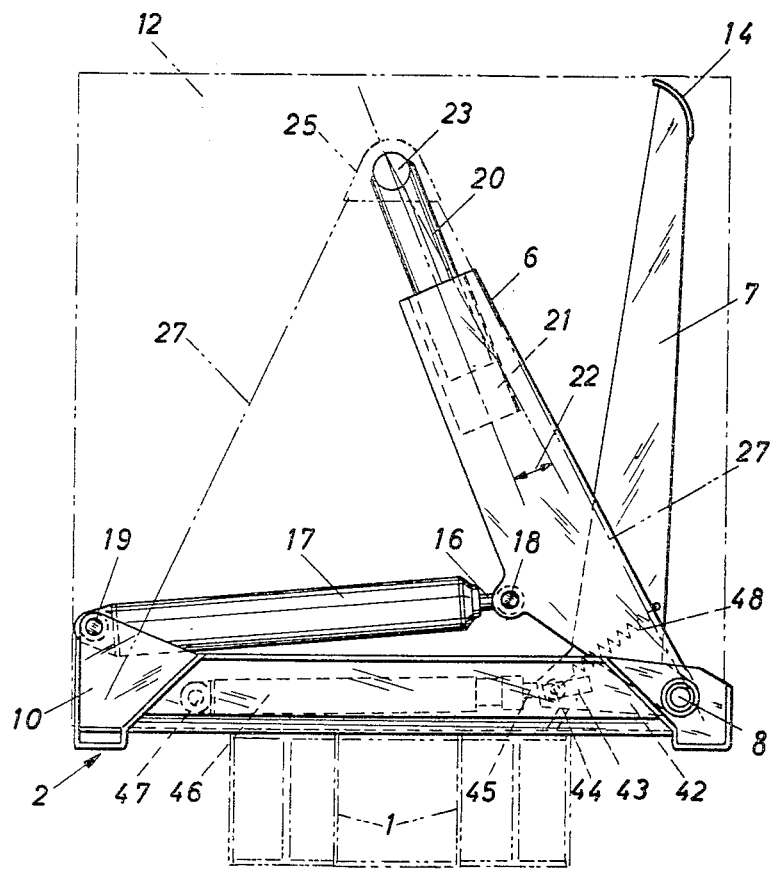

The present invention relates to an apparatus for loading and unloading load containers on vehicles. Instead of load containers also unit loads of goods placed on truck flats or other large flats may be handled. The loading is carried out in lateral direction in relation to the vehicle, e.g. the truck or the trailer with a short reach of the lifting or loading arm of the loading apparatus. The arrangement must render possible a lifting of the load a small distance in vertical direction in relation to the upwardly extending, conical locking pins which normally are used for the locking of the load container on the vehicle. In unfolded position of the loading arm the container should be able to be unloaded with adjustment in horizontal direction.

It is previously known to carry out such a loading on a truck with a capstan which pulls the load up on the vehicle or down from the same. Such a loading is rather time wasting and difficult. Proposals have also been made to carry out the loading by means of two hydraulic loading cranes lifting the container simultaneously at its two ends. By means of such cranes the lifting and the reach may easily be modified but they are rather cost consuming in manufacture and are heavy on the vehicle.

The primary object of the present invention is to overcome the drawbacks mentioned and the invention relates more particularly to loading apparatuses comprising at least two hydraulically operable loading arms and at least two hydraulically operable support legs for the vehicle. The loading arms are at one end journalled to one longitudinal side of the vehicle at a distance which to some extent exceeds the length of the load container so that they can be swung in parallel vertical planes crossing perpendicularly the longitudinal direction of the vehicle. They are at their opposite free end provided with a device for rendering possible a lowering of the load container in an essentially vertical direction when the loading arms are swung upwards and over the vehicle so that their free ends are approximately centrally over the vehicle.

The main feature of the invention is that the device comprises two superposed hydraulic piston-cylinder units which are journalled to levers which are swung about a common shaft, the upper arm serving as a loading arm being connected to the upper hydraulic piston-cylinder unit which at its lower end is shaped as a fork housing the lever connected to the lower hydraulic piston-cylinder unit serving as a supporting leg. Such a device makes it possible to lift a container up on a vehicle and lock it on the chassis frame quickly and easily. The unloading will be as easy. By means of two pairs of hydraulically operable loading arms the load containers may be loaded at the same time. The invention gives a compact construction which requires a small space in the longitudinal direction of the truck. The support legs or arms may at the loading and unloading abut against the ground just below the loading arm so that braking stresses are avoided as much as possible.

According to a preferred embodiment of the invention the shaft on which the loading arm and its support leg are journalled in common, extends between two eyes on one end of a carrying beam extending across the vehicle. By shaping the vehicle with a carrying beam for one end of a load container or for the two adjacent ends of two load containers arranged one after the other on the vehicle there is obtained a weight reduction. The carrying beams may partly replace the cross beams necessary on a vehicle.

Figure 6:
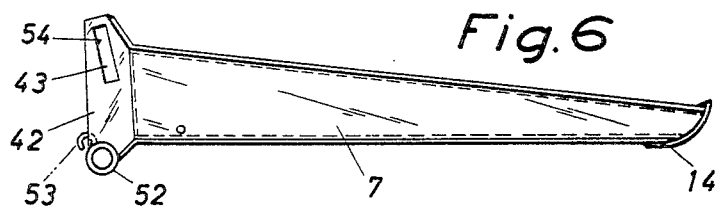
Figure 7:
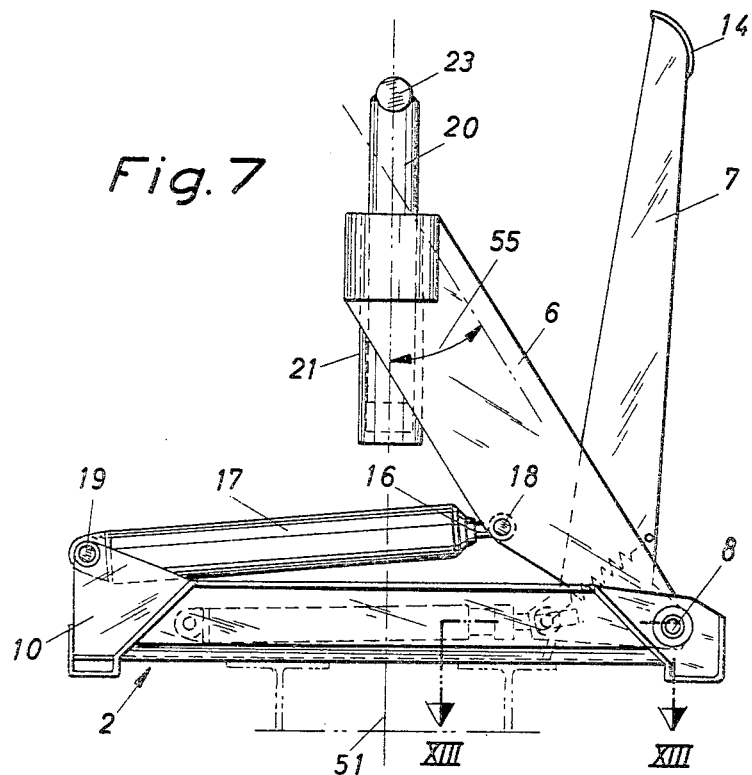
Figure 11:
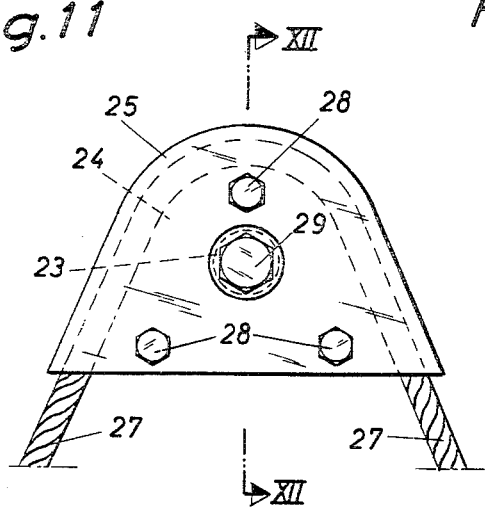
Figure 12:
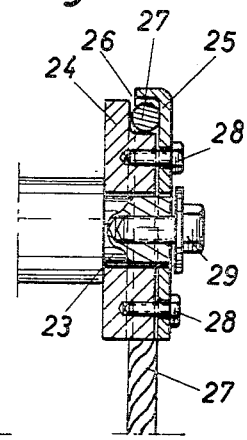
Figure 9:
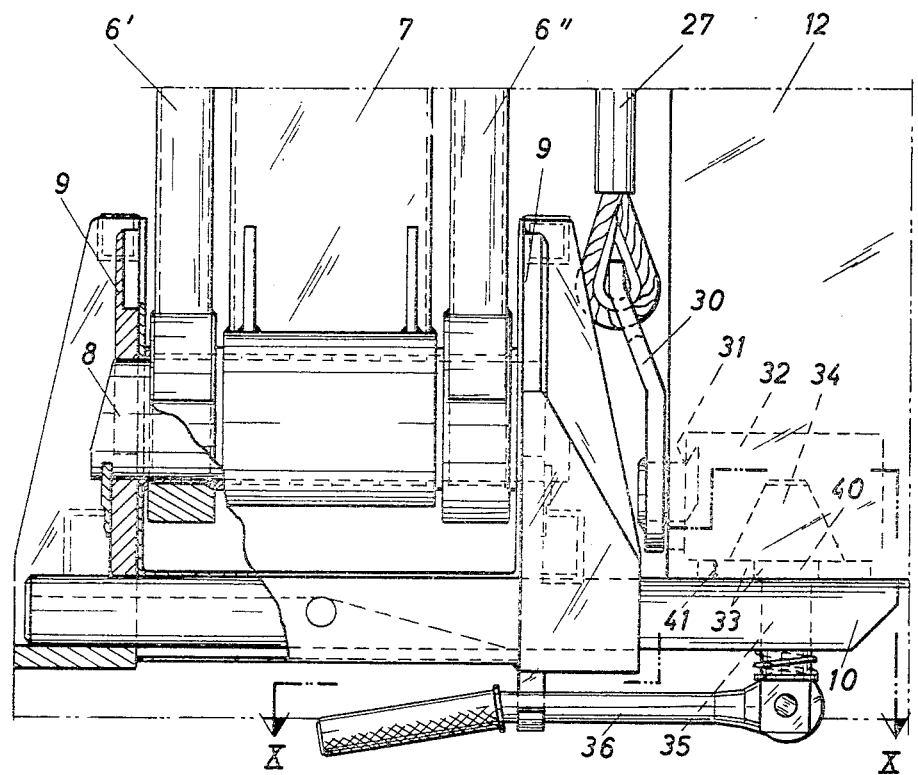
Figure 10:
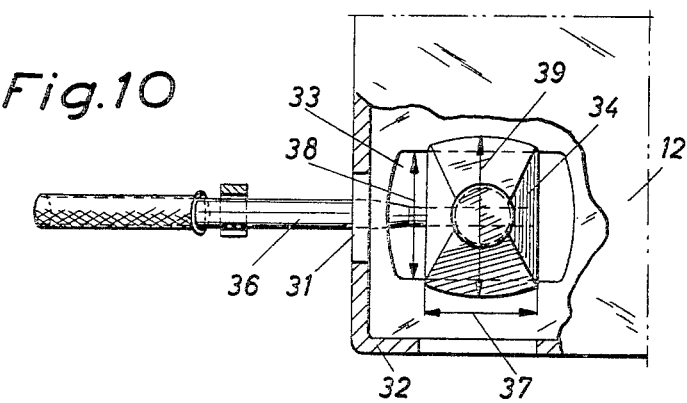

The invention will in the following be described with reference to the accompanying drawings. In the drawings:

FIG. 1 is a side elevational of a semi-trailer provided with loading apparatuses according to the invention for loading and unloading two load containers, one situated in front of the other on the vehicle, FIG. 2 shows a vertical cross section through the vehicle with the support leg of one of its loading apparatuses shown during its swing out, FIG. 3 is a similar cross section with the support leg folded down to supporting position, FIG. 4 shows a similar cross section showing the load container unloaded and arranged on the ground at the side of the vehicle, FIG. 5 shows on an enlarged scale the loading apparatus according to FIG. 2, FIG. 6 is a side elevation of the supporting legs of the apparatus, FIG. 7 is a view similar to FIG. 5 but showing a somewhat modified embodiment, FIG. 8 shows on an enlarged scale a front elevation of the intermediate loading apparatus in FIG. 1, FIG. 9 shows on an even more enlarged scale the lower part of this loading apparatus, FIG. 10 shows a horizontal section on the line X—X in FIG. 9, FIG. 11 shows on a still more enlarged scale an end elevation of the upper end of the lifting arm with a cable attachment at this place, FIG. 12 shows a vertical cross section on the line XII—XII in FIG. 11, FIG. 13 shows a horizontal section through the supporting leg on the line XIII—XIII in FIG. 7 but on a considerably more enlarged scale, and FIG. 14 shows a load container in a perspective view.

Arranged on the longitudinal beams 1 of the trailer 2 of the semitrailer shown in FIG. 1 are at the rear end and the front end two loading apparatuses 3 and 4 and at the centre a third loading apparatus 5. The two first mentioned apparatuses 3 and 4 are provided each with a loading arm 6 and a supporting leg 7, the intermediate loading apparatus 5 being provided with two loading arms 6' and 6" and a supporting leg 7 arranged therebetween. The supporting leg 7 and the loading arm 6 in the two loading apparatuses 3, 4 are with one end journalled about a common shaft 8, which is mounted with the ends in eyes 9 on one end of a carrying beam 10 extending across the beams 1. The carrying beam 10 is provided with transverse flanges 11 which constitute supports for the actual end of the loading containers 12, 13 to be conveyed by the vehicle 2. The loading arm 6 has a channel-shaped cross section and the supporting leg 7 which at its free end is provided with a foot 14 arranged between the two channel walls 15 of the loading arm (FIG. 13).

The loading arms 6, 6', and 6" are swingable in vertical planes crossing perpendicularly the longitudinal axis of the vehicle. The swinging is carried out by means of double-acting hydraulic piston-cylinder units 16, 17. The outer end of the piston 16 is by means of a pivot pin 18 provided with its loading arm 6 at some distance from its pivot shaft 8. The opposite end of the cylinder 17 is by means of a bolt 19 journalled to its carrying beam 10 at the side of the vehicle opposed to the one at which the shaft 8 is situated. The outer free end of each load arm 6, 6', and 6" is provided with a double-acting hydraulic piston-cylinder unit 20, 21 which according to the embodiment shown in FIG. 5 encloses a small acute angle 2 to the longitudinal direction of the loading arm. The outer free end of the piston 20 is provided with a carrying pin 23 extending in or parallel to the longitudinal direction of the vehicle, said pin 23 being shown on an enlarged scale in FIGS. 11 and 12. A cable attachment consisting of two clamping disks 24 and 25 are journalled on the pin 23. The disks 24, 25 form together an arcuate groove 26 for a cable 27 which by means of a number of bolts 28 is clamped with its central portion against the cable attachment. The latter is prevented—by means of a bolt 29 provided with a washer and axially screwed into the pin 23—from sliding off the same. The two free ends of the cable 17 provided each with a lifting hook 30 (see FIG. 9) which can be brought to engage openings 31 arranged for this purpose in corner fittings 32 at the lower border of the load containers 12, 13. The corner fittings 32 are at the bottom provided with elongated notches 33 (see also FIG. 10), a conical head 34 adapted to engage said notches 33 and arranged on the upper end of locking bolts 35 which are each journalled in the carrying beam 10 by means of a handle 36 on the lower end of the locking bolt in question. The head 34 has a non-circular cross section of a width 37 somewhat smaller than the width 38 of the opening 33 but having a length 39 somewhat exceeding the width 38. The locking bolt 35 has a neck 40 of a length somewhat exceeding the thickness 41 of the fitting 32 at the bottom.

The supporting leg 7 is shaped as a bell crank lever. Its shorter arm 42 is at its outer end provided with a groove 43 extending in the direction towards the shaft 8, a cross pin 44 on the outer end of the piston 45 of a double-acting hydraulic piston-cylinder unit 46 running in said groove 43. The piston-cylinder unit 46 is by means of a pin 47 journalled to the carrying beam 10 at its end situated opposite the shaft 8. Between the pin 44 and the supporting leg 7 there is arranged a closely wound pull spring 48 which is adapted to retain the supporting leg 7 in a folded up position during driving.

When a load container, e.g. the one denoted by reference letter 12 in FIG. 1, is to be lifted from the ground 49 (FIG. 4) up onto the vehicle 2, the supporting leg 7 of the loading apparatuses 3 and 5 is swung in clockwise direction by means of the hydraulic piston-cylinder units 45, 46 of these apparatuses to the position shown in FIG. 3 in which the foot 14 of the supporting leg is pressed against the ground 49. At the first part of the displacement of the piston 45 out of the cylinder 46, the pin 44 slides in the groove 43 and only when the pin 44 approaches the end of the notch situated closest to the shaft 8 is there obtained a folding down of the supporting leg 7. When the vertical line from the gravity centre of the supporting leg 7 passes to the right of (see FIGS. 2–5) the shaft 8 the leg is prevented, by the spring 48, from swinging quickly outwards a distance corresponding to the length of the notch 43. Accidents are thereby prevented and there do not occur any stresses during the folding out of the supporting leg. Together with the supporting leg 7 also the loading arms 6, 6' are folded to the position shown in FIG. 4 and this folding out is carried out by means of the hydraulic piston-cylinder units 16, 17 of the loading apparatuses 3, 5. Now, the hooks 30 on the cable 27 on the loading arms 6, 6' suspended from the cable attachment 24, 25 are hooked into the openings 31 in the corner fittings 32 at the front end and rear end of the load cylinder 12. The loading arms 6, 6' are then swung by means of the hydraulic piston-cylinder 16, 17 in counter clockwise direction to the position shown in FIG. 3 in which the load container is situated above the vehicle 2 but with its vertical longitudinal medium plane 50 situated somewhat to the left of the vertical longitudinal plane 51 of the vehicle 2 (lowermost indicated by means of dash and dot lines in FIG. 3). When the load container 12 by means of the hydraulic piston-cylinder unit 20, 21 is lowered to the position shown with unbroken lines in FIG. 3, the head 34 on the locking bolts 35 engages the notches 33 in the corner fitting 32 in question, the locking bolts with their handle 36 then being turned 90° to the position shown in FIG. 10, the load container with the ends resting on the carrying beams 10 is locked to the latter. During the loading the supporting legs 7 take up the oblique load on the vehicle 2.

In the same way the load container 13 is lifted by means of the loading arm 6 of the loading apparatus 4 and the rear loading arm 6" of the loading apparatus 5.

When the loading has been finished the supporting legs 7 are folding up to the position shown in FIG. 2 in which the legs 7 are retained on the one hand by the spring 48 and on the other hand by the weight of the right hand end of the hydraulic piston-cylinder unit 45, 46.

As indicated in FIG. 6 the supporting legs 7 may be provided with a hook attached to their hub 52, the outer end of the spring 48 being attached to said hook 53. The effect of a spring arranged in such a way will be that the pin 44 on the piston 45 during the folding movements of the supporting legs 7 always will slide against the lower (according to FIG. 6 the left hand) border 54 of the notch 43. Also by means of this device there is assured an even swinging out of the supporting leg without any hit stresses.

According to the embodiment shown in FIG. 7 the hydraulic piston-cylinder unit 20, 21 is arranged in FIG. 7 the hydraulic piston-cylinder unit 20, 21 is arranged in such a way on the outer end of the loading arm 6 that the angle 55 between the longitudinal direction of the loading arm and the longitudinal direction of the cylinder will have a sufficient value for ensuring that the cylinder when the loading arm 6 is in a position completely swung in over the vehicle 2, will be situated in the vertical longitudinal medium plane 51 of the same. Due to this device it is rendered possible to lower the load container 12, 13 vertically quite simply by means of the piston 20 without any need of simultaneous adjustment of the swinging position of the loading arm 6. It is then also possible to swing the loading arm 6 inwards against a stop situated in such a way that the piston 20 at the end of the swinging movement of the loading arm will be situated exactly in the vertical longitudinal medium plane 51 of the vehicle. Hereby the loading is considerably facilitated.

Thus, the different details of the loading apparatus 3, 4, 5, may be constructively modified in many ways without departure from the inventive idea. The loading arms 6', 6" on the intermediate loading apparatus 5 may be replaced by one single loading arm but then there is of course required that this loading arm be provided with two cable attachments 24, 25 one at each end of a continuous pin 23 on the outer end of the loading arm. There is required, for the operation of such a loading arm, only one single hydraulic piston-cylinder unit. On short vehicles 2 on which there is room only for one load container 12, there is of course required two loading apparatuses 3, 4, viz. one at the front end of the vehicle and one at the rear end of the vehicle.

What we claim is:

1. An apparatus for loading and unloading load containers (12, 13) on a vehicle comprising a pair of hydraulically operated loading arms (6) and a pair of hydraulically operated support arms (7) for the vehicle, said loading arms (6) having one end journalled to one longitudinal side of the vehicle at a distance from each other somewhat exceeding the length of a load container (12) so that they are swingable in parallel vertical parallel planes which perpendicularly cross the longitudinal direction of the vehicle, said loading arms being at their opposite free ends provided with a device for rendering possible the lowering of a load container (12) essentially in vertical direction when the loading arms are swung up and in over the vehicle (2) so that their free ends are situated approximately centrally over the vehicle, said device comprising two pairs of superposed hydraulic piston-cylinder units (16, 17; 45, 46) which are journalled to said arms (6, 7) swingably mounted on a common shaft (8), the upper arm (6) serving as said loading arm and being connected to the upper hydraulic piston-cylinder unit (16, 17), said arm (6) being at its lower end shaped as a fork, said fork housing the lower arm (7) which is connected to a lower hydraulic piston-cylinder (45, 46) and serves as said supporting arm.

2. An apparatus as claimed in claim 1 wherein the connection of the lower hydraulic piston-cylinder unit (45–46) is shaped to the arm (7) serving as said supporting arm so that at the folding of the same the connection point will have a variable distance to the carrying point (8) of said arm.

3. An apparatus as claimed in claim 1 wherein said support arm (7) is shaped as a bell crank lever, the shorter arm (42) of which is directed upwardly in the operative position of said support arm and is provided with an elongated opening (43), a pin (44) on the outer end of the piston (45) of the lower hydraulic cylinder (46) being displaceable in said opening (43), said cylinder (46) being at the opposite end journalled to a transverse carrying beam (10).

4. An apparatus as claimed in claim 1 wherein said loading arm (6) has a channel-shaped cross section near said carrying shaft (8) and said support arm (7) is mounted on said shaft (8) between two channel walls (15) of said loading arm (6).

5. An apparatus as claimed in claim 3 wherein said mounting shaft (8) extends between two eyes (9) on one end of said carrying beam (10) extending across the vehicle (2) and serving as a support for one end of a load container (12).

6. An apparatus as claimed in claim 1 in which said device comprises a hydraulic piston-cylinder unit (20, 21) arranged so that its longitudinal axis encloses an acute angle (22, 55) with the longitudinal direction of its loading arm (6).

7. An apparatus as claimed in claim 6, wherein the outer free end of a piston (20) in the vertical lowering device for the load container (12) is provided with a carrying pin (23) for a cable (27) provided at each one of its ends with a lifting hook (30) to be inserted into a corner fitting (32) at one end of the load container (12).

8. An apparatus as claimed in claim 3, wherein said transverse carrying beam (10) is provided at its ends with vertical, swingably mounted locking bolts (35) having at their upper free ends a head (34) with a non-circular cross section and tapering in upward direction, said head (34) adapted, at the lowering of the load container (12) down onto the carrying beams (10) engaging locking notches (38) in the bottom of the load container having a corresponding non-circular shape.

References Cited

UNITED STATES PATENTS

| | | | |
|---|---|---|---|
| 2,353,655 | 7/1944 | Day | 214—77 |
| 2,971,661 | 2/1961 | Isaacs | 212—8 X |
| 3,174,630 | 3/1965 | Tantlinger et al. | 212—8 |
| 3,233,759 | 2/1966 | Turturro et al. | 214—80 |
| 3,249,235 | 5/1966 | Roberts | 212—8 |

GERALD M. FORLENZA, Primary Examiner

R. J. SPAR, Assistant Examiner

U.S. Cl. X.R.

212—145